United States Patent [19]
Hoeffken et al.

[11] 3,934,894
[45] Jan. 27, 1976

[54] UTILITY CART AND BAG HOLDER THEREFORE

[76] Inventors: William M. Hoeffken, 301 N. 41st St.; Russell W. Hoeffken, 124 Columbus Drive; Paul W. Hoeffken, 120 N. 36th St., all of Belleville, Ill. 62223

[22] Filed: Apr. 25, 1974

[21] Appl. No.: 463,992

[52] U.S. Cl. ................................ 280/47.19; 248/98
[51] Int. Cl.² ................................................ B62B 1/14
[58] Field of Search ....... 280/47.19, 47.26; 220/1 T, 220/63 R; 248/97, 98, 99; 232/43.2

[56] References Cited
UNITED STATES PATENTS

| | | | |
|---|---|---|---|
| 1,180,225 | 4/1916 | Bamman et al. | 248/99 |
| 3,118,685 | 1/1964 | Jordan | 280/47.19 |
| 3,191,960 | 6/1965 | Turner | 280/47.19 |
| 3,402,848 | 9/1968 | Busey | 280/47.26 X |
| 3,556,395 | 1/1971 | Herman | 248/97 X |
| 3,779,419 | 12/1973 | Heitz | 248/99 |

*Primary Examiner*—Robert R. Song
*Assistant Examiner*—John A. Pekar
*Attorney, Agent, or Firm*—Rogers, Ezell & Eilers

[57] ABSTRACT

An enclosed cart for storing and transporting refuse or other bulky materials has an enclosing lid which overlies the opening to the container, preventing the undesirable entrance of rain or extraneous debris. The cart has a small central hole in the floor panel which allows water to drain from the interior. The cart has wheels at one edge and a handle at the other whereby it may be lifted and moved easily from place to place. The interior of the cart is adapted to enclose cans or bags. Special bag holders fit into the interior of the cart and cooperate with the upper edge of the cart to hold bags. The bag holders may be single or plural whereby one or more bags may be held. The bag holders hold the tops of the bags open and prevent the tops of the bags from being drawn into the interior of the cart under the weight of added material. The bag holders are formed of sheet metal stampings or fabricated from bent wire. Outwardly extending ears on the bag holders overlie the upper edge of the cart and fit within the enclosed lid when the lid is shut. Stops on the frames of the bag holders prevent the holders from sliding or falling into the interior of the cart. The cart is adapted to use both cans and bags simultaneously, if desired.

12 Claims, 27 Drawing Figures

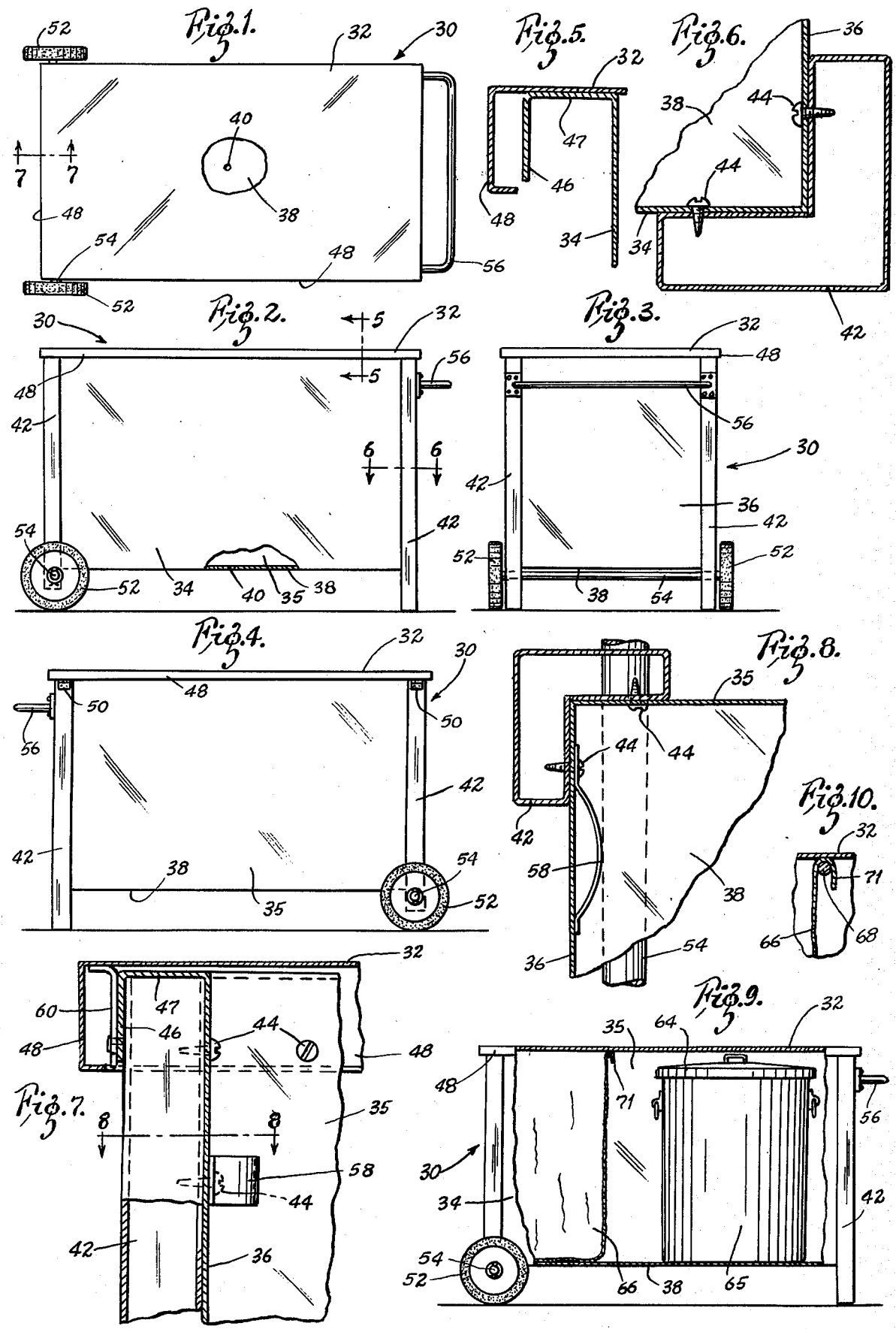

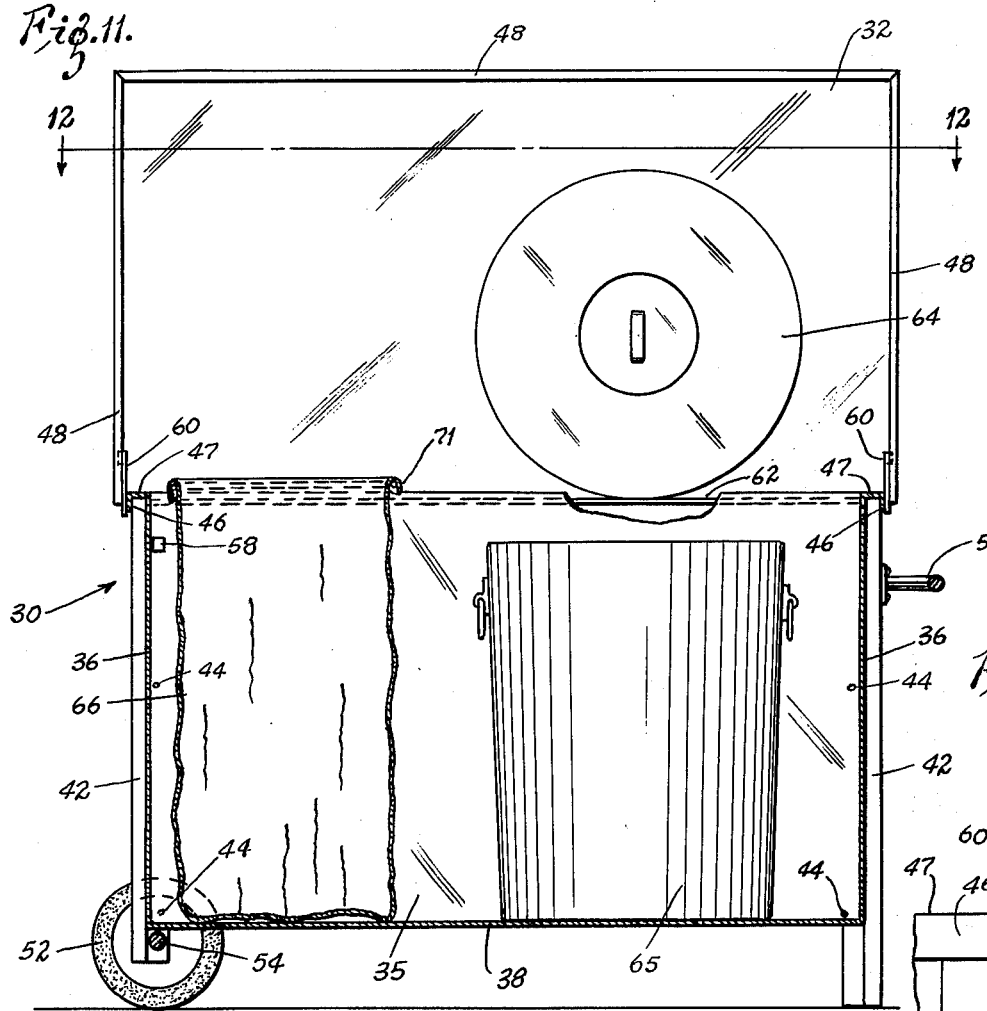
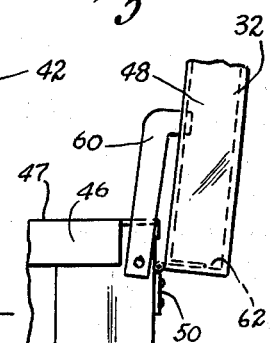
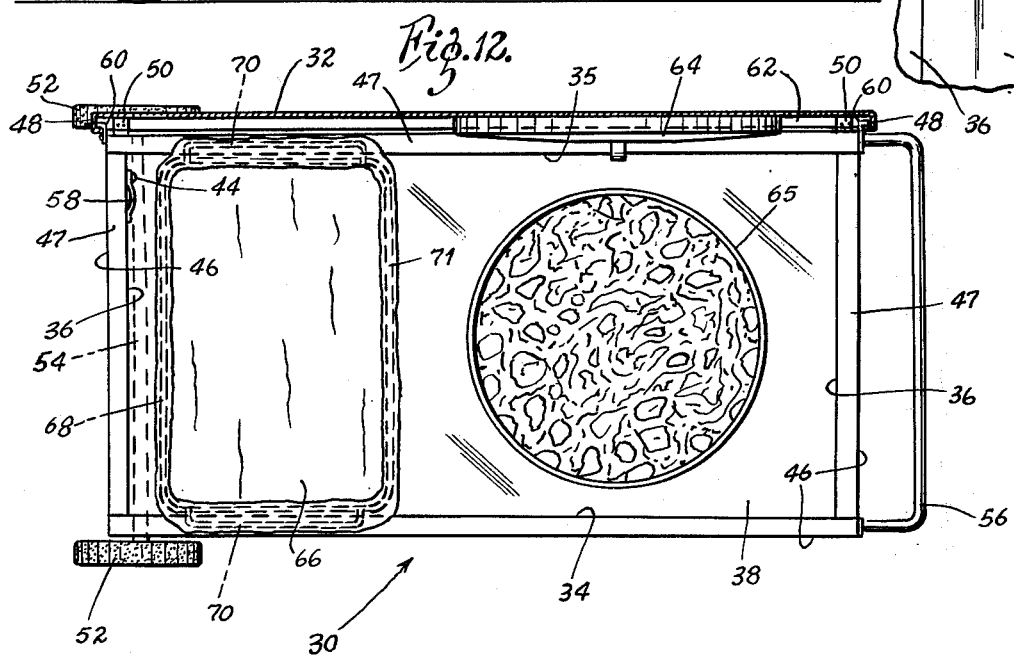

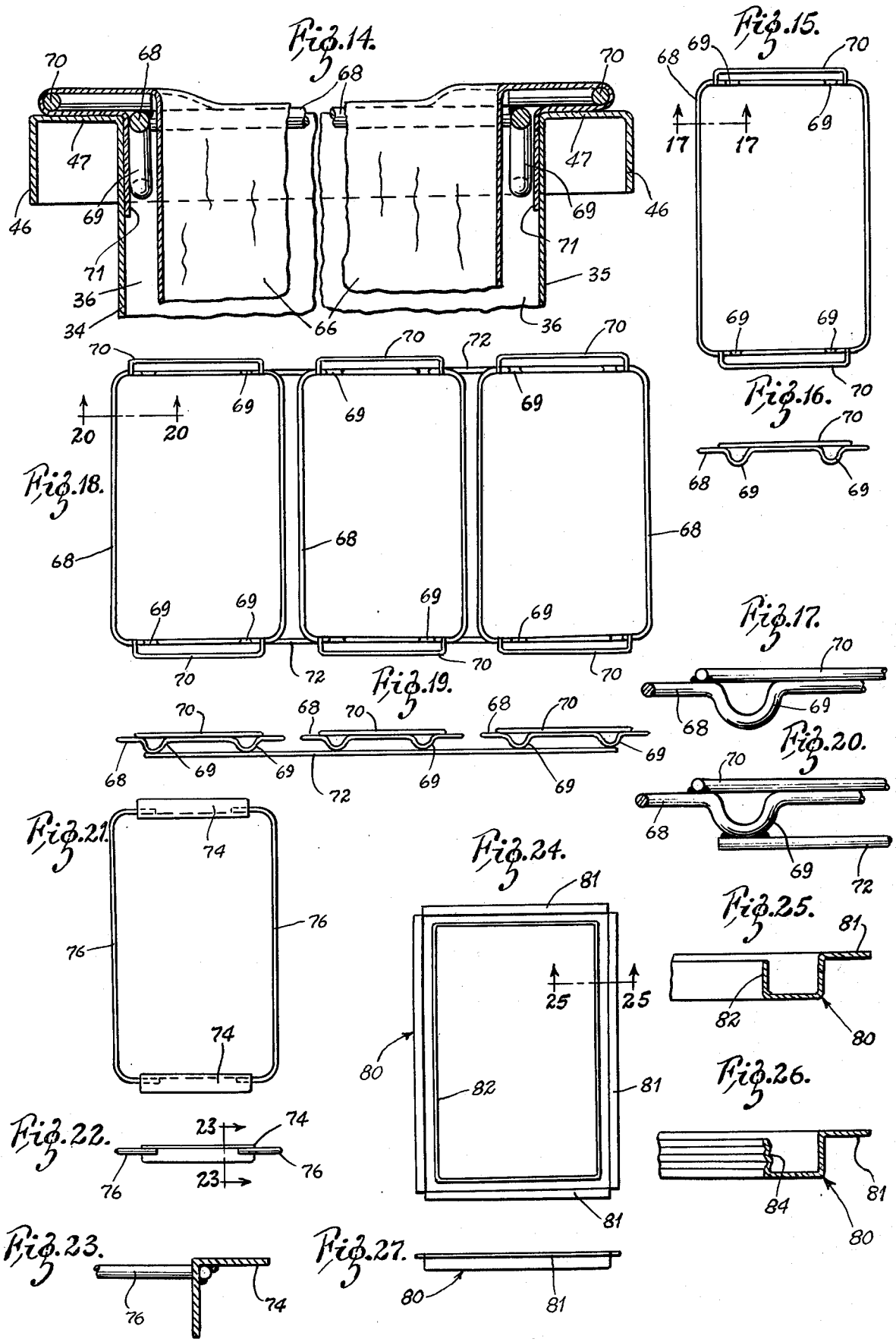

UTILITY CART AND BAG HOLDER THEREFORE

BACKGROUND AND SUMMARY OF THE INVENTION

Known utility carts and trash carts are designed to hold either garbage cans or bags. These carts are inconvenient in that they do not interchangeably use both garbage cans and trash bags. In addition, prior carts are not sufficiently enclosed to prevent combustion of the materials stored therein. Typical devices have open or slotted walls and floors which allow air to pass into the interior of the cart and support combustion of the materials stored therein. Open walls and floors also allow ready entrance of vermin and animals to the interior of the cart.

Applicant's cart stores trash or other bulky items and is adapted to use both bags and cans. The cart is strong enough to protect light gauge cans or bags used therein and protects the material stored in the cart from fire, animals and weather. The cart is designed to prevent sufficient air entering the cart to support combustion. The cart has a small drain hole but it will not pass sufficient air to support combustion. The interior and exterior of the cart have a smooth finish which does not catch or tear cans, bags or clothing or obstruct the use of the cart.

The cart is provided with a cooperating bag rack which may conveniently be interchanged so that plastic bags or garbage cans may be used exclusively or together. The bag holding device readily cooperates with the structure of the cart to hold the bags which are used; yet, it may be readily removed to leave an unobstructed interior when it is desired to use cans.

The cart can be painted in decorative colors, galvanized or otherwise protected from weathering and provides an attractive decorative structure which will not be an eyesore and which will collect and hold accumulated trash and debris.

DESCRIPTION OF THE DRAWINGS

FIG. 1 is a top plan view of the cart of the invention in partial section showing the central drainhole;

FIG. 2 is a front view of the cart;

FIG. 3 is a right side view showing the handle of the cart;

FIG. 4 is a back view of the cart showing the hinges for the lid;

FIG. 5 is a partial section view of the upper edge of one wall of the cart and the lid;

FIG. 6 is a partial section view of the supporting L-tubes;

FIG. 7 is a partial sectional view and fragmentary view of one corner of the cart and lid showing the bag tie retaining clip in the interior of the cart;

FIG. 8 is a partial sectional view taken along the plane of line 8—8 in FIG. 7;

FIG. 9 is a front side view of the cart in partial section;

FIG. 10 is a partial sectional view of the interior of the cart showing a portion of a trash bag suspended in the cart;

FIG. 11 is a front side view of the cart in partial section showing the open lid, a trash bag and a trash can in the interior of the cart and showing a stored trash can lid in the lid of the cart;

FIG. 12 is a top plan view of the cart shown in FIG. 11;

FIG. 13 is a partial side view of the cart shown in FIG. 11 showing the lid stop;

FIG. 14 is a partial sectional view of the cart showing the upper edge of the cart and a trash bag suspended on the trash bag retainer;

FIG. 15 is a top plan view of a single trash bag retainer formed from wire;

FIG. 16 is a front view of the rack shown in FIG. 15;

FIG. 17 is a partial sectional view of the rack shown in FIG. 16;

FIG. 18 is top plan view of a plural bag retainer;

FIG. 19 is a front view of the bag retainer shown in FIG. 18;

FIG. 20 is a partial sectional view of the bag retainer shown in FIGS. 18 and 19;

FIG. 21 is a top plan view of another embodiment of bag retainer formed from sheet metal stamping and wire;

FIG. 22 is a front view of the bag retainer shown in FIG. 21;

FIG. 23 is a partial sectional view of the bag retainer shown in FIG. 22 taken along the plane of line 23—23 shown in FIG. 22;

FIG. 24 is a top plan view of a third embodiment of single bag retainer formed of sheet metal stampings;

FIG. 25 is a partial sectional view of the bag retainer shown in FIG. 24;

FIG. 26 is a partial sectional view of a further modification of the bag retainer shown in FIG. 25; and FIG. 27 is a front view of the bag retainer shown in FIG. 26.

DESCRIPTION OF THE PREFERRED EMBODIMENT

Referring in more detail to the drawings, FIG. 1 shows the trash cart 30 embodying the concepts of the invention having a hinged lid 32 set on vertical side walls 34, 35, vertical end walls 36 and having a bottom panel 38 with a central drain hole 40. The sides, ends and bottom panels are mounted in L-shaped tubes 42 by screws 44 through the panels into the tubes so that the smooth screw heads are to the inside of the structure and the sharp points of the screws 44 are inside the tubes 42 leaving smooth surfaces which will not snag, tear or catch bags, cans or clothing. The top edges of panels 34, 35 and 36 are bent over to form channels 46 so that a smooth surface is presented and a flat lip 47 is formed around the periphery of the top of the cart 30.

Lid 32 has its edges bent to form channels 48 which overlie channels 46 at the upper edge of the cart. Lid 32 is hinged at the top of side panel 35 by hinges 50 which are also mounted on the vertical L-shaped tubes 42.

A pair of wheels are mounted at the bottom edge of L-shaped channels 42 at one end of the cart by passing an axle 54 through the tubes 42 and attaching the wheels to the ends of the axle as shown. A handle 56 is attached to vertical tubes 42 at the opposite end of the cart from wheels 52 and at the upper edge of the wall 36. The cart may be easily moved from place to place by lifting up on the handle and pushing it or pulling it with only wheels 52 resting on the ground.

A small spring clip 58 is attached in the interior of the cart by one of the screws 44 as shown in FIG. 8. The spring clip may be used to hold small items such as wire, bag ties or other items which might easily get lost if left loose in the cart.

As shown in FIG. 13, a stop 60 is provided at the back edge of the cart adjacent to hinges 50 for top 32. The stop prevents the top 32 from rotating significantly more than 90° so that it may be easily lifted from a closed to an open position, but does not travel substantially beyond the open position for convenience of use. Some slight overrun beyond 90° is desirable so that the top will remain open of its own weight.

The top 32, by virtue of the deep channel 48, has a space 62 around its periphery including at its back edge which is hinged to the side wall 35 of cart 32. This space 62 is designed to receive a trash can lid 64, as shown in FIG. 11, so that the lid may be conveniently stored away from the opening into the cart 32, yet be conveniently within reach. A corresponding trash can may be removed from the cart or placed into the cart without losing the cooperating can lid 64. This is particularly convenient when removing cans from the cart for dumping into a central collector. It prevents the lid from getting loose on the ground where it may become damaged, for example, by being run over by an automobile.

The cart is also adapted to utilize fabric or plastic trash bags 66 at the same time that it is utilizing a can, or at different times. The bags are preferably used in cooperation with cooperating bag holders which overlie the channeled edge 46 at the upper periphery of the cart 30. The bag holders may be formed singly so that they may be used in cooperation with trash cans in the same cart, if desired, or they may be formed in plural arrays designed to occupy the entire space in the interior of the cart. FIGS. 15, 16 and 17 show a single trash bag holder 68 designed to hold one trash bag in the interior of the cart.

The trash bag holder 68 is formed in the shape of a rectangular wire framework having downwardly depending bends 69 along its shortest side and having U-shaped ears 70 projecting from its shortest side. U-shaped ears 70 are positioned to overlie the channeled edge 46 at the upper periphery of side walls 34 and 35. Downward depending bends 69 extend into the interior of the cart 32 closely adjacent to side walls 34 and 35 to prevent lateral movement toward and away from walls 34 and 35.

In operation the wire frame is used by inserting the open end 71 of a plastic or fabric trash bag 66 through the interior of the frame until the open end 71 extends slightly above the frame. The open end 71 is then bent over the wire framework under U-shaped ears 70 and extends downwardly adjacent bends 69. The framework is then placed on the channeled edges 46 of the upper periphery of walls 34 and 35 with the bag upper edge 71 held between metal framework 68 and the top of the cart shown at channeled edges 46. The bag is thereby held firmly in place and will not slip into the interior of the cart even when heavy objects are place in it. The bottom of the trash bag 66 extends to the bottom panel 38 in the trash cart, which also provides additional support for the bag 66.

Wire framework 68 may be formed in a plural array as shown in FIGS. 19, 20 and 21 by placing a plurality of the frames in a side-by-side parallel relationship and then attaching them in the array by parallel rods 72 welded to the bends 69 of each wire frame as shown. Further modifications or alternative bag holding frames, shown in FIGS. 21 through 28, may be a combination wire frame and sheet metal structure shown in FIGS. 21 through 23 wherein the end portions are formed of a right angle 74 with a horizontal portion adapted to overlie the channel edges 46 of side walls 34, 35 and a vertical portion adapted to extend downwardly into the interior of the cart closely adjacent to side walls 34 and 35. Right angle 74 prevents longitudinal movement toward and away from walls 34 and 35. The end portions are joined by welded portions 76 which complete the rectangular framework as shown.

FIGS. 24 through 27 show alternative structures which are formed out of sheetmetal stampings. FIGS. 24 and 27 show a single rectangular sheet 80 which is stamped to correspond approximately to the shape of rectangular framework 68 using bent metal portion 81 to provide the functions of U-shaped ears 70 and side framework 68. This sheetmetal framework may have the further modification of having an upstanding edge 82 over which the trash bag may be bent and securd with an elastic band. This portion 82 may be further modified to provide a curved surface shown in 84 which provides additional resistance to slippage of the bag. The stamped sheetmetal bag retainer may be formed either in single or plural structure.

It will be appreciated that the cart 30 with the lid 32 will form a trash enclosure that is sufficiently tight that it will not pass sufficient air to support combustion. Drain hole 40 is in floor panel 38 and allows water to drain from the interior of the cart, thus facilitating cleaning of the interior, but is not sufficiently large that enough air will be drawn into the interior of the cart to support combustion. Lid 32 depends downwardly around the upper periphery of side walls 34, 35 and ends 36 and prevents any substantial amount of air from entering the interior so a fire which is started, by spontaneous combustion or otherwise, in the interior of the device will soon consume all the available oxygen in the interior of the cart and exhaust itself.

The overlapping top or lid 32 of the cart prevents rain or falling leaves and other debris from accumulating or falling into the interior of the cart. Due to the strength and rigidity of the L-shaped tubes 42, which provide the structural basis for the framework, the cart is sufficiently sturdy that it protects the bags or cans in the interior so that bags or light gauge cans may be used without fear of damage or spilling of the trash collected in the bags or cans.

The structure shown in the FIGS. 9 and 11 will accommodate three thirty-gallon trash bags or two twenty-gallon trash cans. However, any single or plural structure can be used to accommodate any convenient number of bags or cans.

It will be appreciated by one skilled in the art that other modifications of the structure can be provided without departing from the spirit of the invention as herein shown. The enclosed description is provided for purposes of illustration and is not intended to limit the scope of the invention claimed. The invention is to be limited only by the scope of the claims appended hereto.

We claim:

1. A cart for containing, transporting and storing trash and other bulky materials adapted to selectively use both bag and can containers and to protect the material contained therein from the effects of weather, fire and animals, having means forming an enclosure; means forming an opening into the enclosure, means for selectively opening and closing the opening, the opening and closing means extending downwardly beyond the opening and positioned to deflect water away from the opening; frame means supporting the enclosure; means mounted on the frame means for moving the enclosure; recess means integral with the opening and closing means for storing and supporting a trash can lid; means cooperating with the downwardly extending portion of the opening and closing means limiting the movement of the opening and closing means in a direction away from the opening; support means on the enclosure adjacent to the opening; removable means in the enclosure for selectively using bags and cans in the enclosure, includiing means for selectively holding a bag in an article receiving relationship within the enclosure, the holding means having at least one downwardly extending projection for cooperating with the support means to position the holding means within the enclosure, and means for hanging the holiday means on the support means, the holding means including the hanging means being adapted to support a trash bag in an article receiving relationship within the enclosure with an open end of the bag positioned between the hanging means and the support means.

2. The device of claim 1 wherein the trash can lid storing means is a recess in the hinged edge of the cover adapted to hold the lid of a trash can when the cover is in the open position.

3. The cart of claim 1 wherein the bag holding means is a rectangular frame, and has a depending element at one edge of the frame adapted to locate the frame in a support, and an opposed pair of outwardly extending members adapted to hold the weight of the frame and an attached trash bag and to retain the trash bag in the frame.

4. The device of claim 3 wherein the bag holding means is formed of welded wire.

5. The device of claim 3 wherein the bag holding means is stamped from sheet metal.

6. The device of claim 3 wherein the bag holding means has plurality of depending elements are provided to position the structure in a support.

7. The device of claim 1 wherein the bag holding means has a plurality of frames.

8. The device of claim 1 wherein the cart has the upper edge of the container formed to provide a platform which is adapted to support the removable bag holding means.

9. The device of claim 1 wherein the removable bag holding means is adapted to support a single bag.

10. The device of claim 1 wherein the removable bag holding means is adapted to hold a plurality of bags.

11. The device of claim 1 wherein additional means is provided in the container to hold and store small items.

12. A cart for containing, transporting and storing trash and other bulky materials adapted to selectively use both bag and can containers and to protect the material contained therein from the effects of weather, fire and animals, having means forming an enclosure; means forming an opening into the enclosure, means for selectively opening and closing the opening, the opening and closing means extending downwardly beyong the opening and positioned to deflect water away from the opening; frame means supporting the enclosure; means mounted on the frame means for moving the enclosure; means integral with the opening and closing means for storing and supporting a trash can lid; means limiting the movement of the opening and closing means in a direction away from the opening; support means on the enclosure adjacent to the opening; removable means in the enclosure for selectively using bags and cans in the enclosures, including means for selectively holding a bag in an article receiving relationship within the enclosure, the holding means having at least one downwardly extending projection for cooperating with the support means to position the holding means within the enclosure, and means for hanging the holding means on the support means, the holding means including the hanging means being adapted to support a trash bag in an article receiving relationship within the enclosure with an open end of the bag positioned between the hanging means and the support means.

* * * * *